June 21, 1966  R. A. PEARSON ETAL  3,257,002
APPARATUS FOR SETTING UP AND PLACEMENT
OF PARTITIONS FOR CONTAINERS
Filed April 30, 1964  12 Sheets-Sheet 1

INVENTORS
REINHOLD A. PEARSON
WILLIAM DEWEY RIGG
BY

ATTYS.

INVENTORS
REINHOLD A. PEARSON
WILLIAM DEWEY RIGG
BY

ATTYS.

June 21, 1966 R. A. PEARSON ETAL 3,257,002
APPARATUS FOR SETTING UP AND PLACEMENT
OF PARTITIONS FOR CONTAINERS
Filed April 30, 1964 12 Sheets-Sheet 6
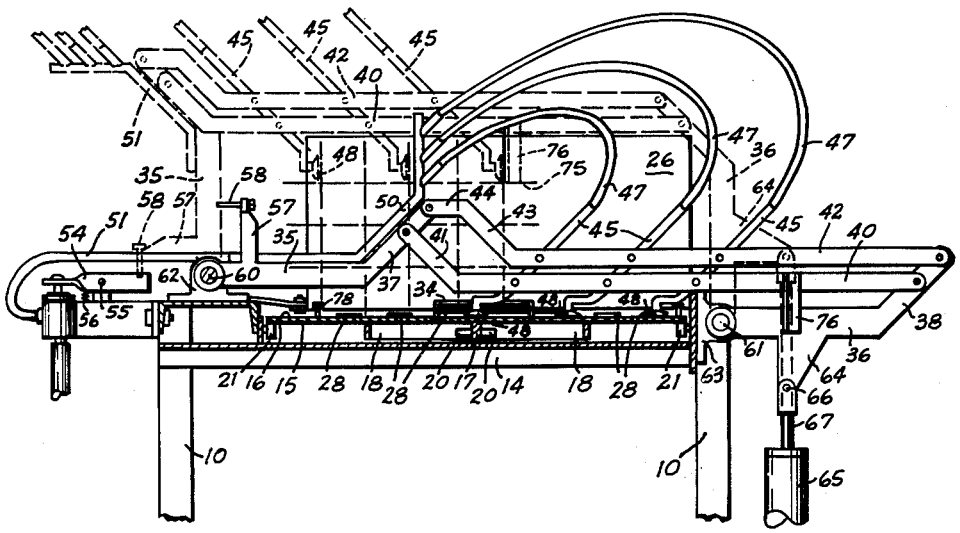
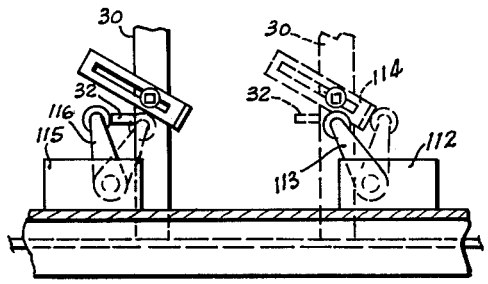
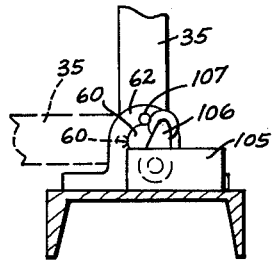
INVENTORS
REINHOLD A. PEARSON
WILLIAM DEWEY RIGG
BY
ATTYS.

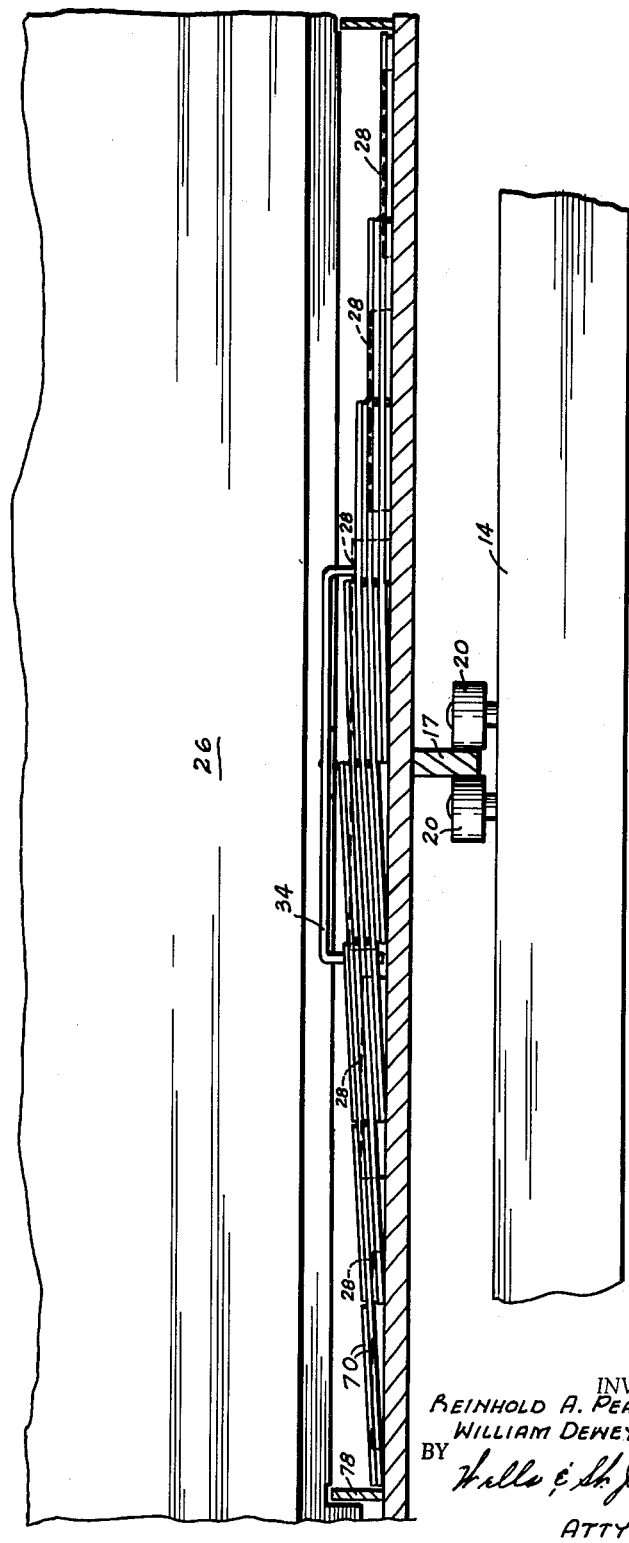

INVENTORS
REINHOLD A. PEARSON
WILLIAM DEWEY RIGG
BY
ATTYS.

June 21, 1966  R. A. PEARSON ET AL  3,257,002
APPARATUS FOR SETTING UP AND PLACEMENT
OF PARTITIONS FOR CONTAINERS
Filed April 30, 1964  12 Sheets-Sheet 9
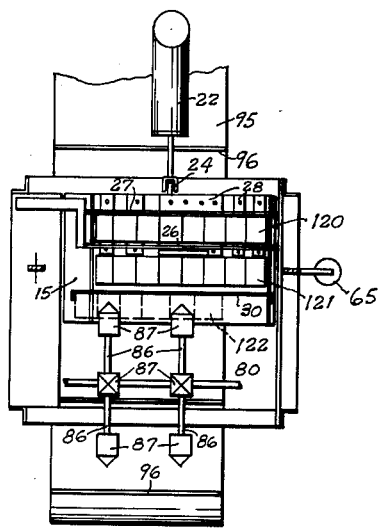
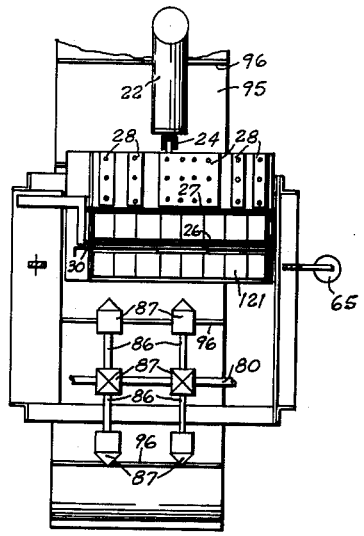
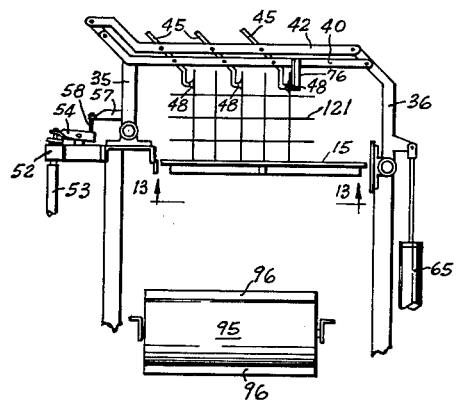
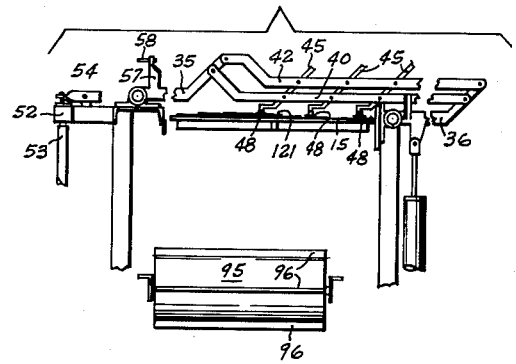
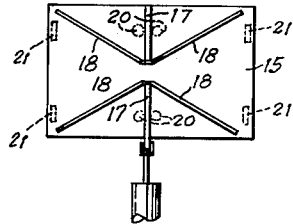
INVENTORS
REINHOLD A. PEARSON
WILLIAM DEWEY RIGG
BY
ATTYS.

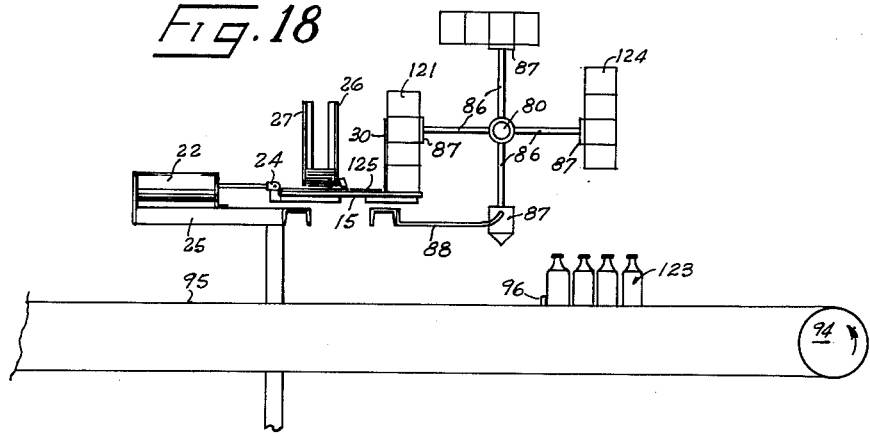
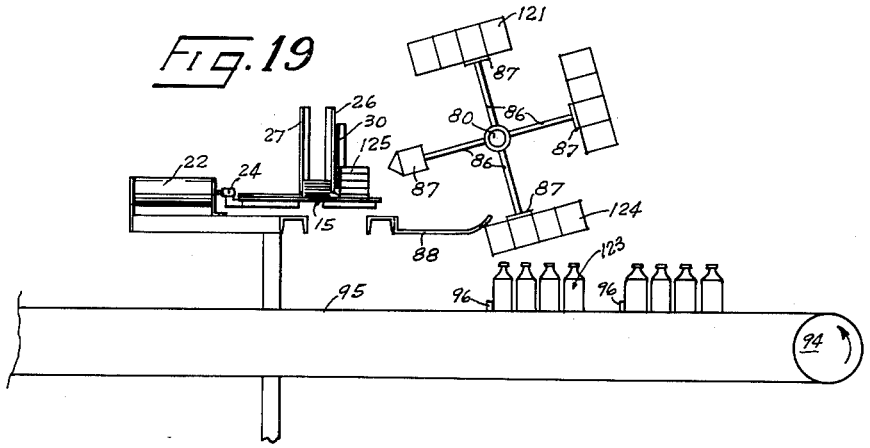
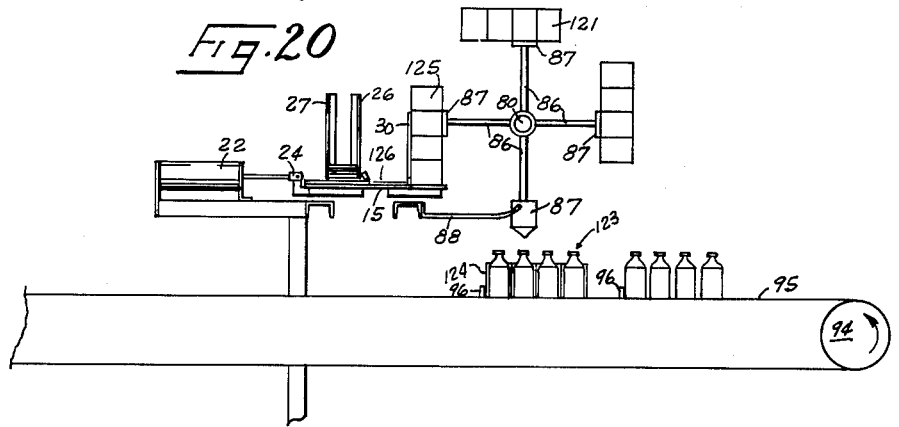

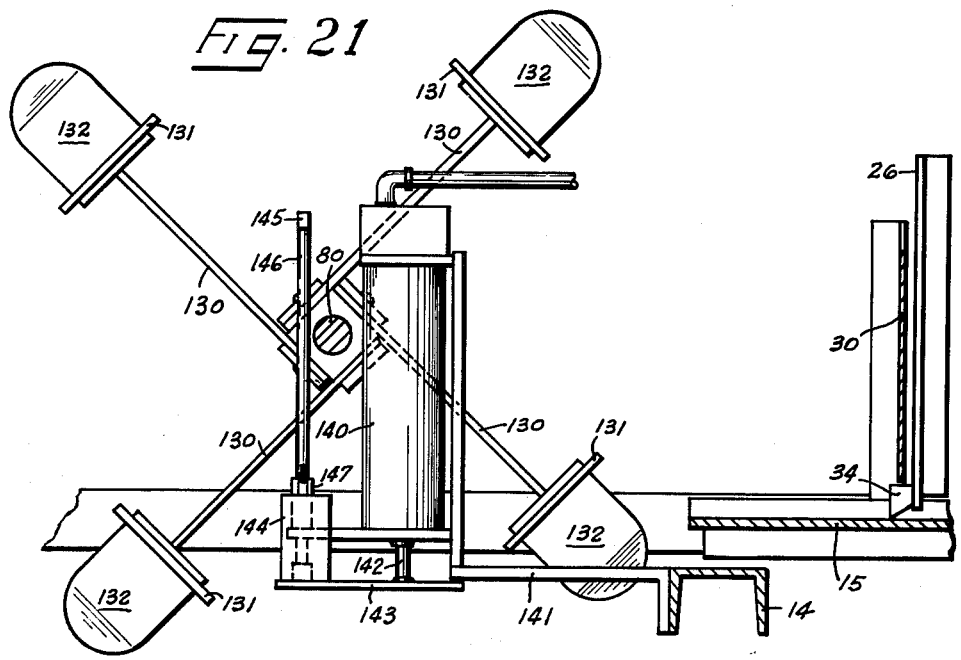

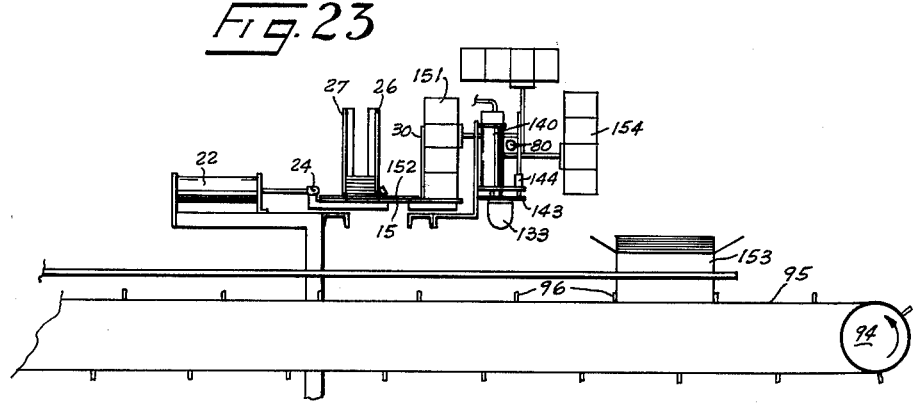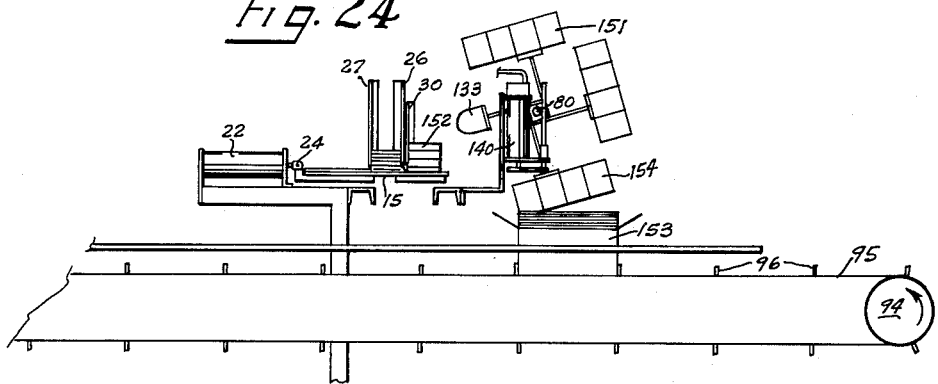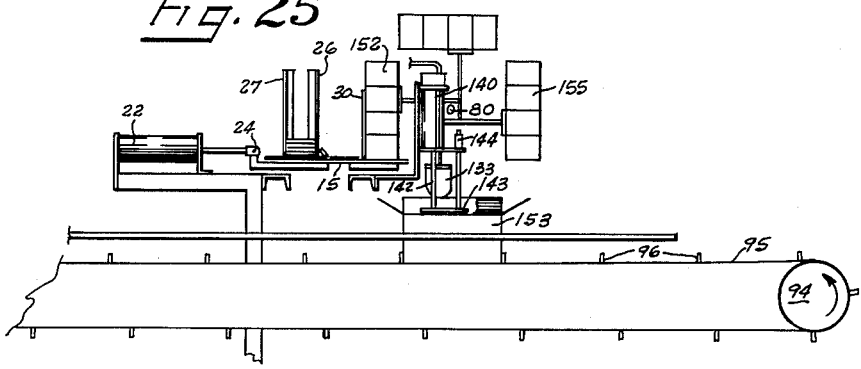

`United States Patent Office`

3,257,002
Patented June 21, 1966

3,257,002
APPARATUS FOR SETTING UP AND PLACEMENT
OF PARTITIONS FOR CONTAINERS
Reinhold A. Pearson, c/o R. A. Pearson Co., S. 12 Division Ave., Spokane, Wash., and William Dewey Rigg, 3211 Fairfield Road, Olympia, Wash.
Filed Apr. 30, 1964, Ser. No. 363,829
17 Claims. (Cl. 214—1)

This invention relates to a novel apparatus for mechanically setting up and placing paperboard container partitions used to separate bottles or jars in a carton.

It is a general practice to separate bottles or jars in cartons by paperboard partitions formed in a rectangular intersecting pattern so that a vertical wall of paperboard separates otherwise abutting surfaces of adjacent bottles or jars. These partitions are necessarily made of rather thin material, sufficiently strong to withstand the usual movement of the jars, and are held in position by the jars themselves. The partitions do not interlock and are not self sustaining in their expanded positions, other than in a direction perpendicular to their height, except by action of the abutting bottles or jars.

In some instances, the containers are first placed in the carton and the partition is then located between them, and in other instances the partition is first positioned between the containers prior to the placement of the containers and partitions in a carton as a unit. In either instance, the setting up and placement of the partition is usually accomplished by hand, an operation that is both uneconomical and which constitutes a rather tedious chore.

It is a first object of this invention to provide a completely mechanised device for setting up the common types of partitions presently in use. The mechanical arrangement described below acts to support the expanded partition at all times so as to maintain it in a controlled state. In this manner, the flexible partition is utilized without necessitating the substitution of more costly rigid materials.

Another object of this invention is to provide such a mechanism that is very compact, the actual setting up of the partitions being accomplished in a width equal to twice the height of the partition being handled.

Another object of this invention is to provide a unique conveyor for transferring the expanded partitions from the apparatus that sets them up to the containers or cartons adapted to receive the partitions.

These and further objects will be evident from a study of the following disclosure, taken together with the accompanying drawings which illustrate a preferred form of the invention and one modification of the transfer conveyor. It is to be understood that the details of the structures shown in the drawings are merely exemplary, and that various modifications might be made within the skill of one trained in this art.

In the drawings:

FIGURE 7 is a sectional view taken along line 7—7 in FIGURE 4, showing the feed and erection apparatus, the erection apparatus being shown in its elevated position in dashed lines;

FIGURE 8 is an enlarged fragmentary view showing two of the control switches as seen along line 8—8 in FIGURE 4;

FIGURE 9 is an enlarged fragmentary view showing a third control switch as seen along line 9—9 in FIGURE 4;

FIGURE 10 is an enlarged sectional view taken along line 10—10 in FIGURE 4, showing the relationship that exists between the feed mechanism and a partition in the storage hopper;

FIGURE 13 is a reduced bottom view of the feed table, the supporting and guiding rollers being shown in dashed lines;

FIGURES 14 through 20 are a series of diagrammatic views illustrating the operation of this apparatus;

FIGURE 14 is a top view showing the feeding of a carton from the hopper;

FIGURE 15 is a top view illustrating the return of the feed mechanism to its original position;

FIGURE 16 is a front elevation view showing the erection apparatus in its lowered position;

FIGURE 17 is a view similar to FIGURE 16, showing the carton after its erection;

FIGURE 18 is a side elevation view showing the transfer of an expanded divider to the transfer conveyor;

FIGURE 19 is a view similar to FIGURE 18, showing the placement of a divider over an arranged group of bottles;

FIGURE 20 is a view showing the final placement of the partition;

FIGURE 21 is an enlarged fragmentary sectional view taken along a line corresponding to line 21—21 in FIGURE 2, showing a modified form of transfer conveyor and ejector apparatus for handling of the expanded partitions;

FIGURE 22 is a rear view of the apparatus as shown in FIGURE 21;

FIGURES 23 through 25 are diagrammatic views similar to FIGURES 18 through 20, illustrating the operational steps utilized with the modified apparatus shown in FIGURES 21 and 22;

FIGURE 23 illustrates the transfer of an expanded partition to the transfer conveyor;

FIGURE 24 illustrates the initial placement of a partition in an empty carton; and FIGURE 25 illustrates the final placement of the partition within the carton.

Figure 11:
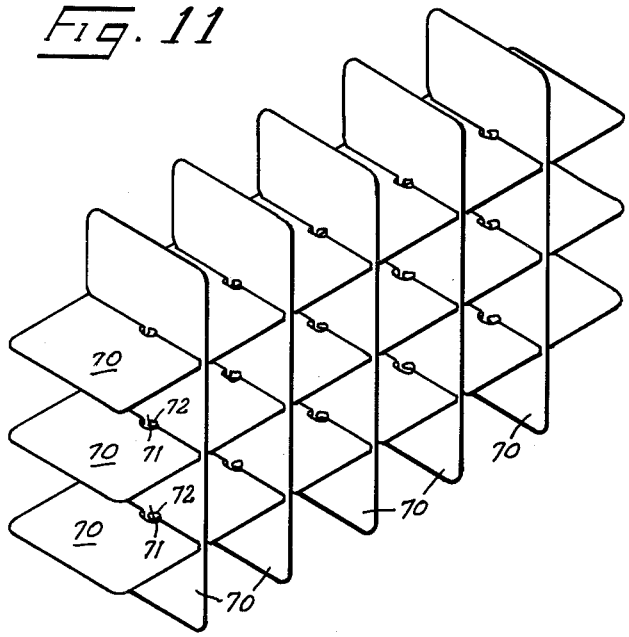
FIGURE 11 is a perspective view of an expanded partition of the type adapted to be set up by the instant apparatus.

The apparatus to be described below is a mechanical device for setting up and placement of partitions such as that shown in FIGURE 11. Such a partition is conventionally utilized to separate adjacent bottles or jars in larger containers such as a paperboard or corrugated carton. The particular partitions adapted to be set up by this apparatus are usually made of rather thin paperboard which is quite flexible. They are usually held in their desired position by abutment of the jars or bottles received within them and by abutment of the carton walls. Until placed in a carton, such partitions have no stability except when resting with their respective walls in an upright vertical position supported by a horizontal surface. Thus, handling of the partition is rather difficult since they do not assume and maintain any particular shape.

The partitions themselves are made of interlocking strips 70 which are slotted and intersect one another to form a series of cubical patterns when expanded. The perpendicular strips are provided with apertures 71 and interlocking tabs 72 to maintain the intersecting strips in the desired interspersed relationship relative to one another. This construction, shown in FIGURE 11, is merely exemplary of one form of the partition and it is to be recognized that this apparatus is equally applicable to the setting up and placement of similar and equivalent partitions, made of other materials, whether these materials be more or less flexible.

The partition is usually shipped in a flattened condition in which the partition is of greater length than after it has been expanded to bring the strips 70 perpendicular to one another. When in its collapsed condition, such a partition is relatively thin at its outer ends, and progressively more thick toward its center, as a greater number of strips overlap one another at the center than at the ends. This increases the difficulty of handling the partitions, since they do not stack in a flat condition but produce a stack that is considerably more thick at the center than at its ends. This factor can be better understood by a study of FIGURE 10, which shows a section view cut through a collapsed partition.

Figure 2:
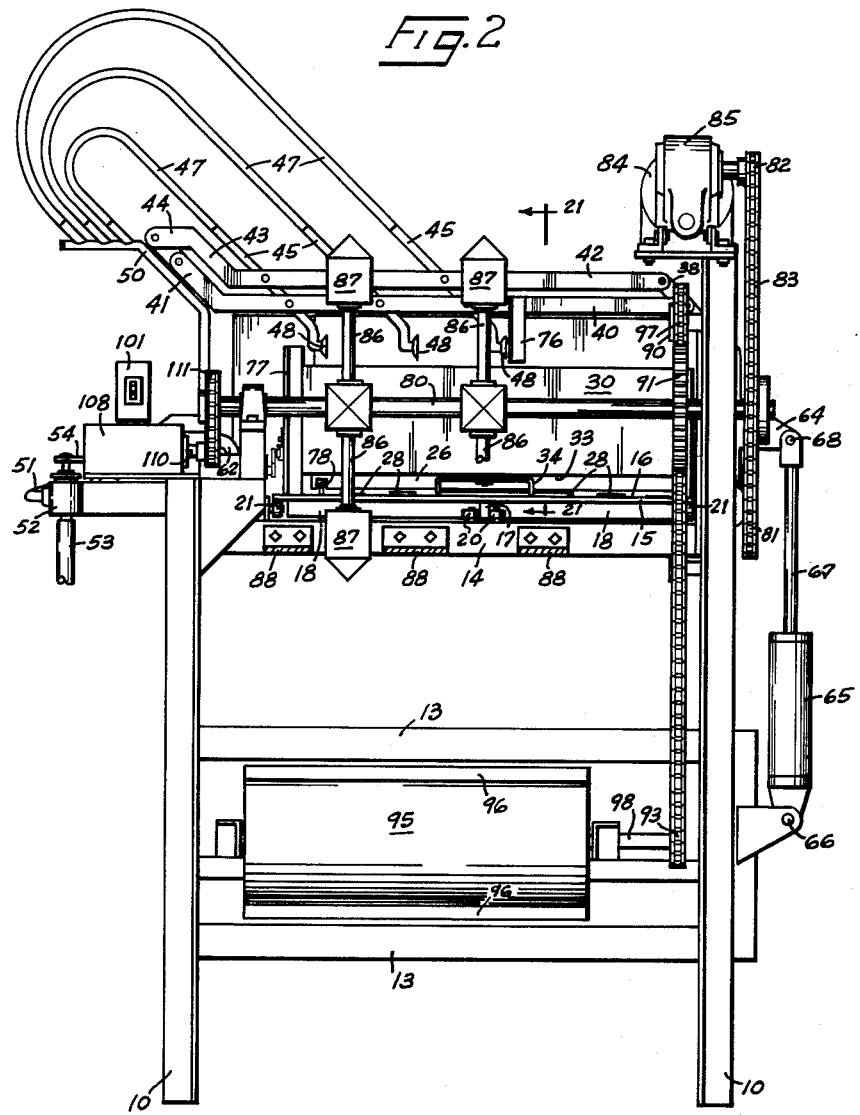
FIGURE 2 is a rear end view of the apparatus as seen from the right in FIGURE 1.

The supporting rigid framework for the apparatus is mounted on vertical legs 10 and includes top members 12 as well as intermediate horizontal braces 13 that are rigidly connected to one another to produce a rectangular framework. As the various mechanical operations carried out by the devices on this framework involve movement of the partitions from one end of the framework to the other, the end of the framework to the left in FIGURES 3, and 4 shall be termed the rear end of the apparatus and the opposite end seen at the right in FIGURES 3 and 4 shall be termed the forward end of the apparatus. Thus, FIGURE 2 is a rear view of the machine. This distinction between front and rear ends of the various components and forward and rearward movement of the partitions shall be utilized consistently in the following description and in the claims that follow it.

*Hopper and feed assembly*

The arrangement by which the collapsed cartons are stored and fed to the location on the framework at which they are expanded can best be seen in FIGURES 1 through 6. In these drawings, there are shown two transverse supporting channels 14 located adjacent the top of the rigid framework and fixed in place by connections at their ends to other portions of the framework previously described.

A horizontal table 15 is supported by the channels 14 for reciprocable movement in a forward or rearward direction. The table 15 comprises a flat, horizontal top surface 16 which supports both the collapsed cartons and the expanded cartons during the operations produced upon them. The bottom of the table is provided with front and rear longitudinal ribs 17 (FIGURE 13) which are connected to diagonal ribs 18 that serve to reinforce the table 15 and insure the necessary rigid horizontal structure required by the apparatus.

Two pairs of horizontal rollers 20 are rotatably mounted respectively on the channels 14 and abut the opposite surfaces of the two longitudinal ribs 17 to thereby guide the table 15 for longitudinal movement in a rearward or forward direction relative to the fixed framework. These rollers and their engagement with the ribs 17 can best be seen in FIGURE 6. Two pairs of vertical rollers 21 are mounted on the respective channels 14 adjacent the lateral side edges of the table 15 and serve to locate the table 15 in an elevational direction, the rollers 21 being the elevational supports for the table 15. These rollers can best be seen in FIGURE 7. The table 15 is therefore positively guided by means of the rollers 20 and is elevationally supported by the rollers 21 so that it is free to move forwardly or rearwardly in a straight line reciprocating motion relative to the fixed framework of the machine.

Movement of table 15 is achieved by means of a pneumatic cylinder 22 of conventional construction. The cylinder 22 is mounted in a fixed position on a frame extension 25 and the free end of its piston rod is connected at 24 to the movable table 15. Expansion of the cylinder 22 will cause the table 15 to move in a rearward direction, while contraction of the cylinder 22 will cause the table 15 to move in a forward direction.

Mounted directly above the front portion of table 15 is a fixed hopper mounted on the supporting framework. This hopper is adapted to hold a vertical stack of collapsed partitions for feeding into the machinery. It includes a rear wall 26 and a front wall 27 each having inwardly directed end corners to locate the partitions relative to the remainder of the apparatus.

Fixed to the top surface 16 of table 15 along its front edge are a series of stepped surface strips 28. The stepped surface strips 28 terminate along a series of aligned rear edges in a straight transverse line. The individual strips 28 have increasing thickness toward the center of the table 15. This increase in thickness from the outer strips 28 to the center strip 28 is chosen so as to conform to the variations in thickness of the collapsed partition as noted above. The relationship between the thickness of the strips 28 and the thickness of the collapsed partition is illustrated best in FIGURE 10.

The front wall 27 of the hopper is relieved along its lower edge so as to allow free passage of the table 15 and the respective strips 28. The rear wall 26 is also relieved so as to allow free passage of a single partition under the wall 26. The wall 26 prevents more than one partition from passing beneath it at a time, the distance separating the lower edge of the wall 26 and the top surface 16 of the table 15 being the maximum thickness of a collapsed partition.

The length of each strip 28 is slightly greater than the height of the partition strips 70 being fed from the hopper. Thus, the strips 28 extend completely across the hopper when the cylinder 22 is in its fully expanded position (FIGURES 4 and 6) so that the remaining partitions in the hopper rest on the smooth strips 28 and are not disturbed during the feeding of the lowermost partition from beneath the lower edge of the rear wall 26.

Figure 6:
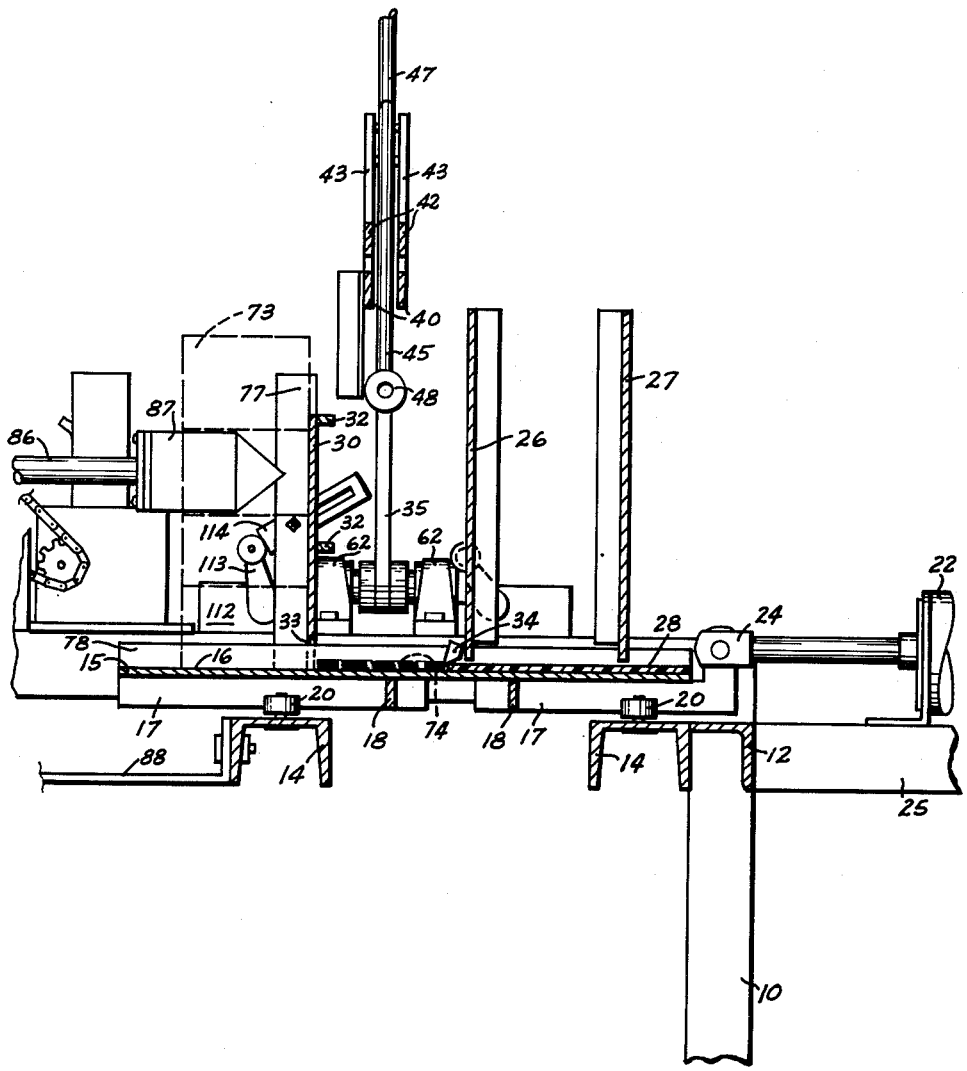
FIGURE 6 is an enlarged fragmentary sectional view of the feed and erection apparatus seen along line 6—6 in FIGURE 4.

The partition being fed rearwardly from the hopper is engaged by the rear edges of the strips 28 and pushed rearwardly until it has passed a positioning member 34 that is pivotally carried on the rear surface of the wall 26 adjacent its lower edge. The member 34, best seen in FIGURE 6, allows passage of a partition in a rearward direction, but pivots downwardly and forwardly so as to prevent return of the partition when the table 15 is moved to the right as seen in FIGURE 6. The transversely aligned rear edges of the member 34 serve to positively locate the longitudinal position of the partition fed onto the table 15.

In operation, the partition being fed moves in unison with the table 15 in a rearward direction due to its abutment by the aligned rear edges of the strips 28, but is prevented from returning with the table 15 in a forward direction due to its abutment against the member 34, which is fixed relative to the hopper and supporting framework. The smooth top surface 16 of the table 15 will merely slide beneath the partition during return of the table 15, and the strips 28 will then return to a location wherein their rear edges clear the remaining partitions in the hopper, so that the next partition can fall downwardly onto the top surface 16 in preparation for feeding of it. Thuus, reciprocation of the table 15 will intermittently feed individual partitions onto the top surface 16 at a location rearwardly adjacent to the hopper.

One further longitudinal movement of each partition is required in order to place the expanded partition on the transfer conveyor that carries the partition to the awaiting bottles or carton. This is accomplished by means of a vertical abutment wall 30 carried by upright supports 31 at each side of the table 15, the wall 30 being located on the table 15 rearwardly of the hopper wall 26. The location of the abutment wall 30 on table 15 is such that the wall 30 can be positioned directly adjacent to the wall 26 when the table 15 is in its forward position and will move rearwardly a distance somewhat greater than the height of the single partition when the table 15 has been moved to its rearward position as shown in FIGURE 6. The wall 30 is reinforced by a pair of horizontal forward ribs 32, and the lower edge 33 of the wall 30 is spaced upwardly from the top surface 16 of table 15 by a distance somewhat greater than the height of a collapsed partition resting on the surface 16.

In operation, the wall 30 can span a collapsed carton resting on the surface 16 so as to freely move forwardly and rearwardly without disturbing such a partition. The purpose of the wall 30 is to push rearwardly against an expanded carton, and it is not designed to act upon or disturb collapsed cartons. In FIGURE 6 there is shown an expanded carton 73 designated in dashed lines, and a collapsed carton 74, also shown in dashed lines. It is to be noted from this figure that the expanded carton 73 is moved rearwardly due to abutment of the wall 30 at the same time that the collapsed carton 74 is being moved rearwardly from the hopper due to its abutment by the strips 28.

During the normal operation of the machine, an expanded partition 73 will be moving rearwardly to the transfer conveyor apparatus at the same time that a collapsed partition 74 is being moved rearwardly to the erection apparatus that expands it. Forward movement of the table 15 will cause the wall 30 to move over the collapsed carton 74 so that wall 30 will be in proper position to push rearwardly against the partition 74 after it has been expanded.

*Erection assembly*

Following the location of each partition as shown at 74 in FIGURE 6, wherein it abuts the member 34 and rests upon the table 15, the partition must be erected to a vertical or expanded condition such as that shown at 73 in FIGURE 6 or as shown at 75 in FIGURE 7. This is accomplished, following forward return of the abutment wall 30, by means of an erection assembly which can best be seen in FIGURES 4, 6 and 7. FIGURE 7 shows the erection assembly in full lines at its lowered position and in dashed lines at its raised or upper position. At its lowered position, the erection assembly grasps a single collapsed partition, and at its upper position, the grasped partition has been pivoted and expanded vertically to its rectangular desired shape.

The erection mechanism involves a parallelogram arrangement, supported at the left as seen in FIGURE 7 by an idle crank arm 35. Crank arm 35 is pivotally carried on the supporting framework by means of a pivot shaft 60 supported by bearings 62. At the right hand end of the assembly is an actuating crank arm 36 pivotally carried by means of a pivot shaft 61 rotatably journalled by bearings 63 on the supporting framework. The main portions of each arm 35, 36 are parallel to one another, and movable from a horizontal position to an upright vertical position. At the end of the arm 35 is an angular portion 37 directed at a 45° angle relative to the horizontal main portion of the arm 35. A similar angular portion 38 is provided at the outer end of the arm 36, the end portions 37 and 38 being parallel to one another.

Connected across the angular portions 37, 38 are two parallel arms, the lower arm being designated by the numeral 40. The arm 40 terminates at its left end in an angular portion 41 directed at an angle of 45° upwardly from its horizontal main structure. A parallel upper arm 42 has an angular end 43 parallel to the end portion 41 and an offset tip 44 that is pivotally connected to the upper end of the angular portion 37 of crank arm 35. This offset portion 44 provides the required clearance for the proper positioning of the parallel arms 40, 42 when in the upper position as shown in dashed lines in FIGURE 7. Each end of each arm 40 and 41 is independently pivoted to the respective crank arms 35 and 36 about parallel longitudinal axes.

Thus, the arms 40 and 42 will always remain parallel to one another, but will shift laterally relative to one another due to the angular relationship that exists between the portions 37, 38 and the main structure of the arms 35, 36. The angular offsets provided at the left hand end of the arms 40 and 42 as shown in FIGURE 7 are required in order to properly position the arms 40, 42 adjacent to the table 15, while clearing the adjacent mechanism at the left hand side of the apparatus.

The basic relationship of the various pivots can be described as follows. The two crank arms 35, 36 are pivotally carried at each side of the framework about parallel longitudinal axes. They are movable between a horizontal position and a vertical upright position angularly displaced 90° from the first horizontal position. The distances spanning the respective end pivots of the horizontal arms 40, 42 are equal and a first plane containing the pivotal axes of the two arms 40, 42 on either of the crank arms 35, 36 intersects a second horizontal plane containing the end pivotal axes of either arm 40, 42 at an angle of 45° when the crank arms 35, 36 are in either of its vertical or horizontal positions.

Carried on the arms 40 and 42 are a plurality of tubes 45. In the present instance there are three tubes 45, each being pivoted at 46 to the respective arms 40 and 42. Each tube 45 is a rigid hollow pipe that has mounted at its end a vacuum cup 48. The remaining end of each tube 45 is connected by means of a hose 47 to a main supply tube 50 mounted on the crank arm 35, the end of the supply tube 50 being connected by means of a flexible hose 51 to a vacuum breaker 52. The vacuum breaker 52 is connected by means of a hose 53 to a suitable source of vacuum pressure (not shown).

It is to be noted that the main body of each tube 45 is carried by the arms 40, 42, in a position parallel to the angular portions 37, 38. This angular position and relationship will always be maintained, so that the tubes 45 will remain parallel to the portions 37, 38 throughout travel of the crank arms 35, 36. It is also to be noted that the contacting surface of each vacuum cup 48 is directed at an angle of 45° relative to a plane containing its support pivots 46. This also will be maintained. Thus, as the crank arms 35, 36 pivot about their respective shafts 60 and 61, the vacuum cups 48 will be turned 90° from their horizontal lowered position to a vertical upper position as illustrated in FIGURE 7. At the same time, the vacuum cups 48 will be shifted to the left, thereby raising and expanding the strips 70 of the carton designated in FIGURE 7 by the numeral 75.

The height of the respective arms 35, 36 is such that the lower surfaces of the upright strips 70 will remain resting upon the table 15 at all times, so that the lowermost corners of the partition 75 do not move from their original locations. The dimensional relationship between the erection assembly is such that it corresponds at all times to the angular relationship of the straight pivoting strips 70 in partition 75, so as to expand or erect the partition 75 in a very natural way.

Movement of the actuating arm 36 is governed by means of a cylinder 65, pivoted at its lower end about a longitudinal axis at 66 on the supporting framework (FIGURE 2). The free end of piston rod 67 is connected at pivot 68 to a downwardly protruding extension 64 formed on the arm 36, so as to provide the needed clearance for movement of the piston rod 67 from its contracted position to its expanded position. It is believed that this operation is quite evidence from the showing of FIGURE 7.

The vacuum breaker 52 is fixed to the supporting framework, and is operated by movement of the crank arm 35. The operating lever 54 that normally closes the vacuum circuit is biased to its closed position by means of a spring 56. The lever 54 is pivoted to the framework, as shown in FIGURE 7 at 55. A small arm 57 extends from the idle crank 35 at a right angle to it, and has an abutment screw 58 at its terminal end, adapted to engage the lever 54 when the arm 35 is in its upright position. Thus, there will be vacuum established at the vacuum cups through breaker 52 at all times except when the screw 58 is in engagement with the lever 54. This will occur only when the arms 35, 36 are in their upright vertical positions, shown in dashed lines in FIGURE 7. Thus, vacuum is insured during the entire erection process and no timing mechanism is required in order to control the establishment of vacuum at the cups 48.

The partitions being set up by this apparatus are not very rigid, and have no angular stability when in an upright position as shown at 75 in FIGURE 7. It is therefore necessary to provide abutting surfaces to maintain the partition in this upright position without collapse after breaking of the vacuum at the cups 48. This is accomplished primarily by means of a downwardly protruding bracket 76 that is fixed to the lower parallel arm 40 at such a location that it will be brought directly adjacent to the right hand cup 48 when the arms 35, 36 are in their vertical upright positions. In the lowered position, the bracket 76 will clear the framework and will not interfere with the engagement of the cups 48 and the collapsed partition. The bracket 76 extends rearwardly from the lower arm 40 so as to provide a continuing guide for the rearwardly moving expanded carton during the initial movement of the carton due to movement of abutment wall 30.

The partition is also guided by the location of the cups 48, even after breaking of the vacuum, and by abutment with the left hand rear corner 77 on the abutment wall 30, as well as by an upstanding longitudinal strip 78 fixed to the top surface 16 of table 15, along which the left-hand side edge of the collapsed carton slides, and along which the left-hand vertical strip 70 of the expanded carton 75 will be located. In this manner, the expanded rectangular partition is precisely located relative to the apparatus that has erected it to the condition shown in FIGURE 7.

The location of the vacuum cups 48 is such that they will come down upon alternate end corners of the strips 70 that are to be expanded to a vertical or upright position. It has been found that it is necessary to engage only alternate strips 70 rather than each strip 70, the remaining strips being pivoted by the interlocking connections that exist between the final horizontal and vertical strips 70 in the partition. The vacuum cups 48 act in concert to pivot the carton to its expanded condition without placing undue strain on any portion of the carton, which might lead to collapse of the carton or bending of its elements. The mechanism as shown and described operates effectively, regardless of the lack of strength in the partition members themselves. The partition is not allowed to withstand any forces other than direct longitudinal forces along its own upright members when in a fully vertical position. The partition is at all times guided by fixed and rigid members that insure the maintenance of the proper rectangular relationship desired in the expanded partition.

*Transfer conveyor*

Figure 3:
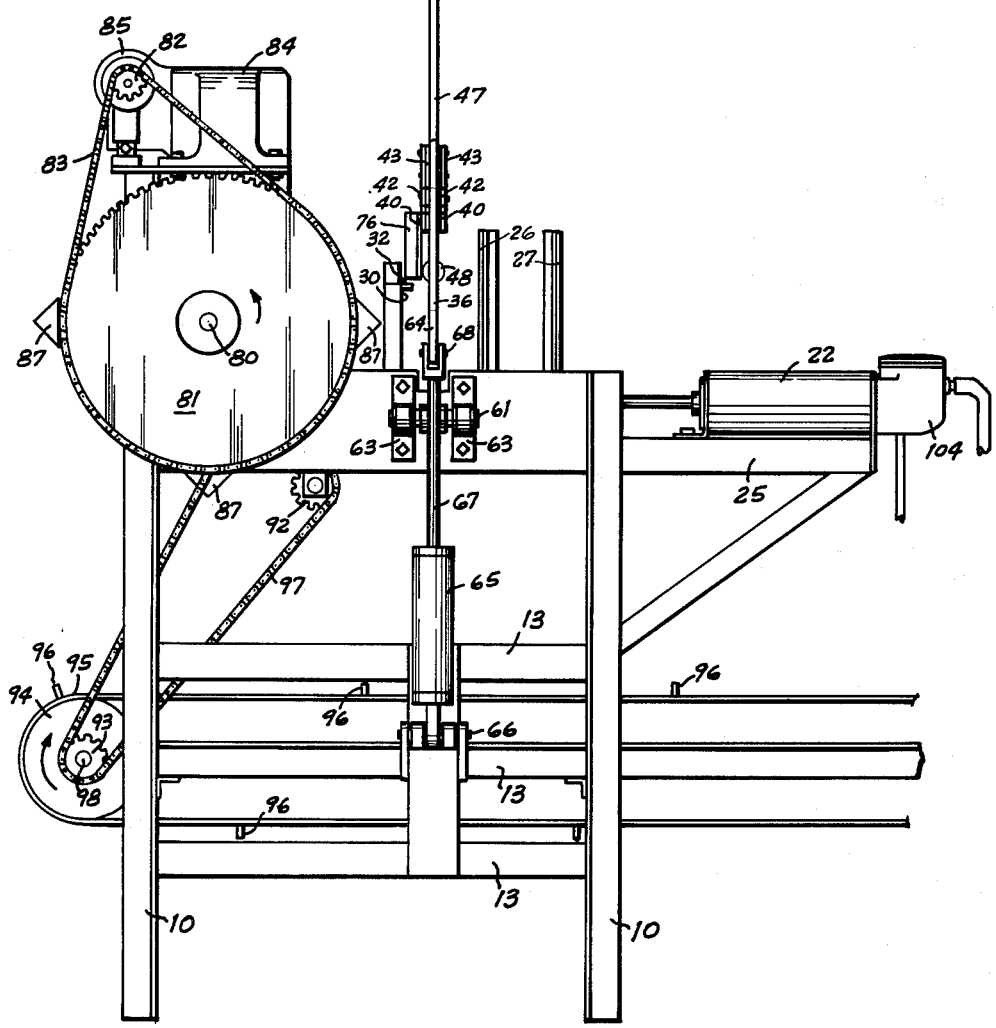
FIGURE 3 is a side view of the apparatus taken from the side opposite to FIGURE 1.

The transfer conveyor by which the expanded partitions are placed on bottles or in a container, such as a carton, can best be understood by a study of FIGURES 1, 2, 3 and 4. The conveyor is located adjacent to the erection apparatus and comprises a main transverse shaft 80. Shaft 80 is suitably mounted on the supporting framework for rotational movement about a horizontal transverse axis. It is turned about this axis by means of a large driven sprocket 81 fixed to shaft 80 at its right end as seen in FIGURE 2. The sprocket 81 is turned by a small driving sprocket 82 and an intermeshing roller chain 83. The driving sprocket 82 is powered by a motor 84 and a transmission 85 mounted on the framework directly above the driven sprocket 81. The shaft 80 is thus continually turned in a slow counterclockwise direction as seen in FIGURE 3.

The shaft 80 has fixed to it two sets of radial arms 86, each set including four arms 86. Each arm 86 extends radially outward from the axis of shaft 80 and terminates in an enlarged rectangular block 87 having a tapered outer end. The rectangular cross-section of each block 87 is complementary to the rectangular opening within an expanded partition 75 as seen in FIGURE 7. The location of the shaft 80 is such that when each arm 86 is in a horizontal direction facing forwardly relative to the framework, it will be in exact alignment with one of the openings in the expanded partition 75. Thus, the partition 75 can then be pushed rearwardly by the abutment wall 30, causing the partition 75 to be received on the two forwardly facing blocks 87. The motion of the abutment wall 30 can be so quick that the moving blocks 87 can adequately grasp the interior of a partition without tearing its interlocking connections.

Figure 1:
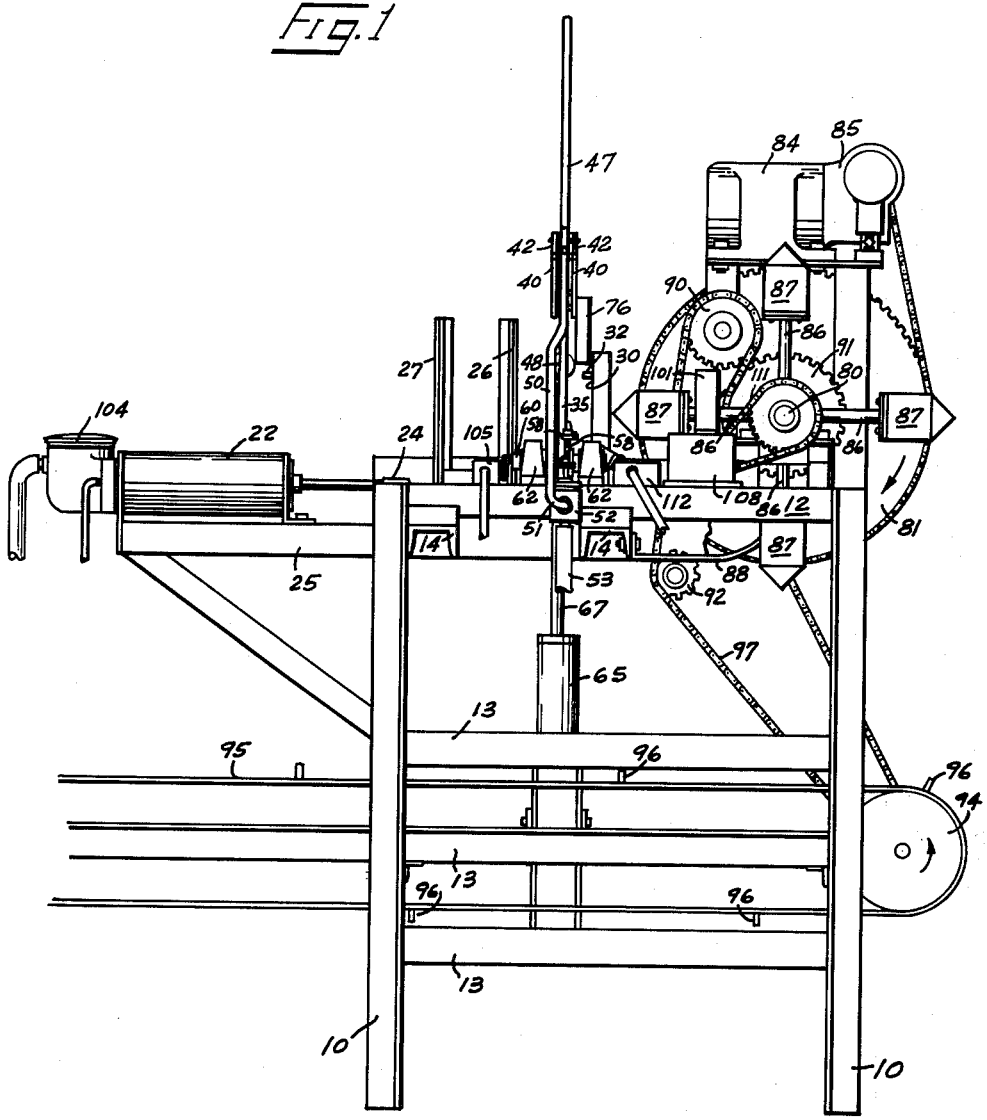
FIGURE 1 is a side view of the apparatus.

The transfer conveyor is adapted to place the expanded partitions over bottles or into a carton on a lower horizontal conveyor that can be seen in FIGURES 1 through 3. The lower conveyor as shown in these drawings has been necessarily shortened due to space configurations, but would ordinarily extend a considerable distance beyond the apparatus in each direction. As seen in FIGURE 1, an idler sprocket 90 is rotatably mounted on the framework on a stub shaft that is parallel to the axis of the main shaft 80. The sprocket 90 is engaged by a driving chain 97 that intermeshes with a driving sprocket 91 fixed to the shaft 80 inwardly from the large driven sprocket 81. A spacer sprocket 92 is also engaged by chain 97, and serves to adequately space the two sides of chain 97 so that they do not interfere with one another.

Chain 97 turns a driven sprocket 93 on a main conveyor shaft 98. Fixed to the shaft 98 is a conventional conveyor roll or cylinder 94 that is engaged by a conveyor belt 95. The conveyor belt 95 is continuous, and includes upper and lower flights moving in opposite directions as indicated by the arrows in FIGURES 1 and 3. The belt 95 is provided with exterior transverse slats 96 that serve as spacing and placement guides for the bottles that are carried on the belt 95. The positive drive from the single shaft 80 insures proper timing between the conveyor belt 95 and the radial arms 86, so that the expanded partitions are brought in a timed relation upon the bottles resting on the upper flight of the belt 95.

In order to remove the expanded partitions from the blocks 87 on which they are impaled, there are provided rearwardly directed stripper plates 88 on the fixed framework that extend in an arc both rearwardly and upwardly, intersecting the lowermost location of the blocks 87 in the manner seen in FIGURES 1 and 2. These stripper plates therefore cause the expanded partitions to be gradually shifted in a radial outward direction relative to the arms 86 as the arms 86 rotate about the axis of shaft 80. The forward end of the partition will first begin to fall from the blocks 87, and will be followed by the remainder of the partition as it is urged outwardly due to contact by the plates 88.

*Controls*

The controls for this apparatus are relatively simple, and utilize conventional components. They will be generally described, although all of the electrical and pneumatic connections are not shown in the drawings.

Figure 12:
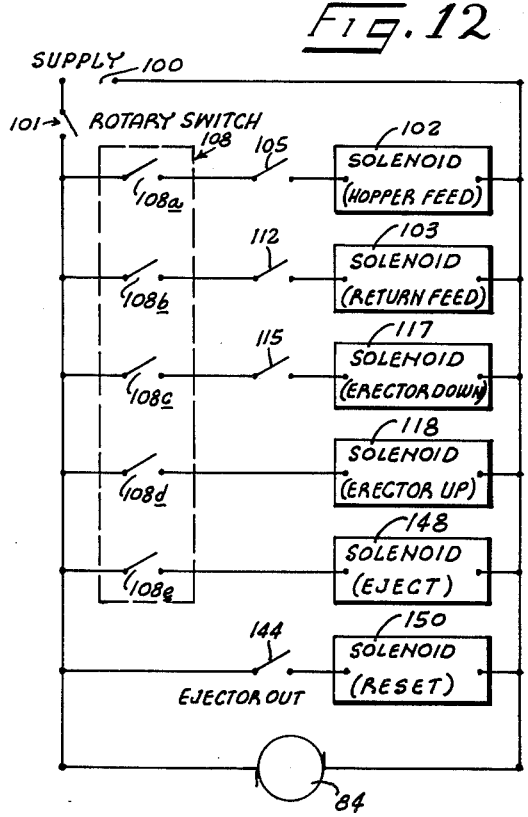
FIGURE 12 is a wiring diagram of the controls utilized in conjunction with this apparatus.

As seen in FIGURE 12, the electrical controls are unified and connected to a power supply 100. This power supply 100 is wired to the apparatus through a master switch 101 which is manually controlled to operate all of the various mechanisms. Wired across the supply 100 through the master switch 101 is the "hopper feed" solenoid 102 and the "return feed" solenoid 103 for the four-way valve 104 of the cylinder 22 that controls the feed assembly. When the solenoid 102 is activated, the cylinder 22 will cause the table 15 to move rearwardly and feed a single partition to the erector mechanism, and when the solenoid 103 is actuated, the cylinder 22 will return the table 15 to its original forward position.

The solenoid 102 is controlled by an erector interlock switch 105 that is shown in detail in FIGURE 9. The switch 105 has an operating lever 106 that is adapted to be abutted by a protruding pin 107 that turns in unison with the shaft 60 of the idle crank arm 35 at the left of the assembly shown in FIGURE 7. The lever 106 is located so that the switch 105 will be closed when the erector has reached its fully upright or vertical position. At all other times, switch 105 will be open so that the solenoid 102 will be inactivated. Thus, raising of the erector apparatus to its fully upright position causes the cylinder 22 to feed rearwardly, pushing the expanded partition and a collapsed partition simultaneously in a rearward direction as previously indicated.

There is one further control provided in this apparatus so as to insure a proper timed relationship between the transfer conveyor and the feed and erection devices. This is a rotary cam-operated switch of conventional design, designated generally in the drawings by the numeral 108. The switch 108 actually comprises a series of rotary switches that are actuated in a timed relationship by preset cams. The driving shaft 110 of the switch 108 is turned by means of a chain 111 powered indirectly from the main transverse shaft 80 of the transfer conveyor apparatus. The purpose of the switch 108 is to insure that the ejected partitions will be received on the continuously rotating blocks 87. Thus, there is provided in the switch 108 a first timed switch 108a wired in series with the erected interlock switch 105 so that the circuit to the hopper feed solenoid 102 can be completed only in the proper timed relationship relative to the rotation of shaft 80. At all other times, the switch 108a will be open.

Figure 4:
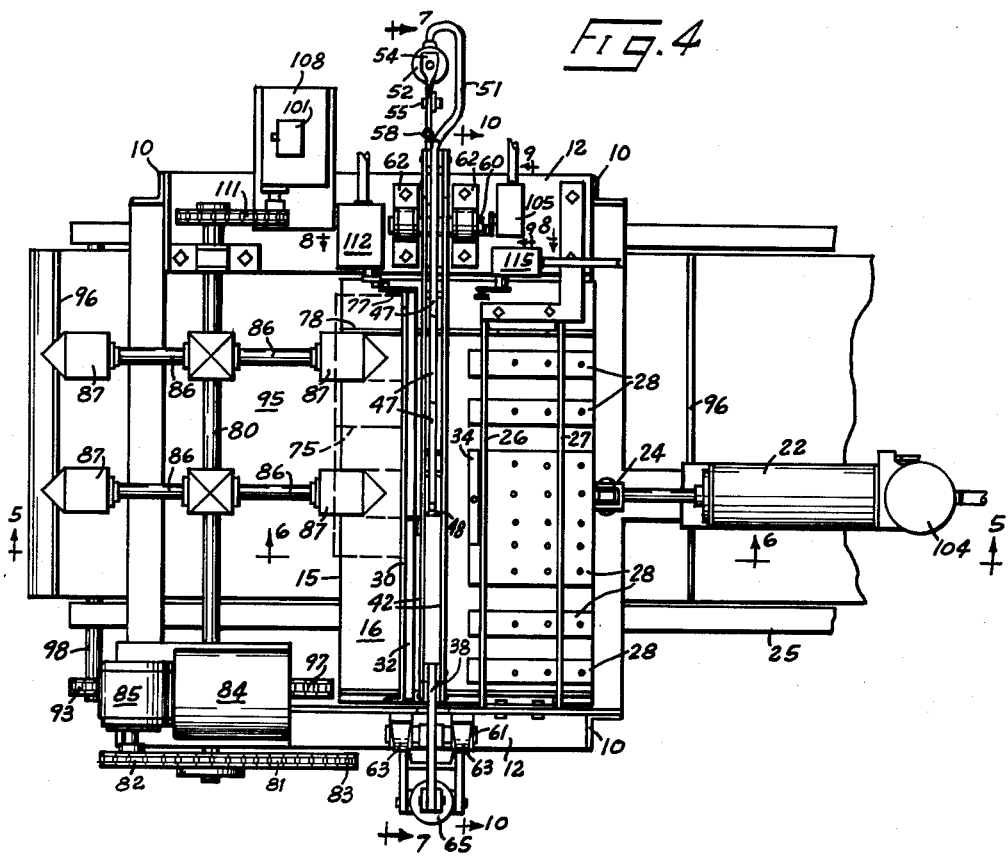
FIGURE 4 is a top view of the apparatus shown in FIGURE 1.
Figure 5:
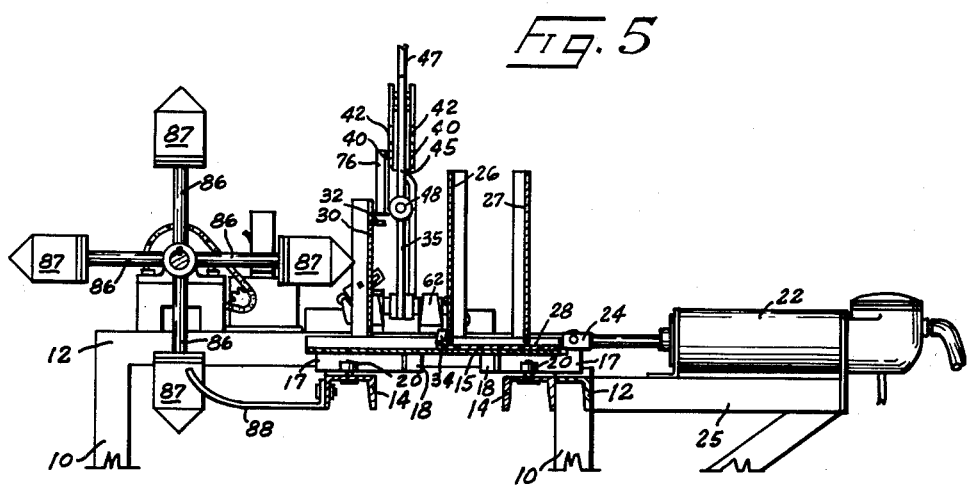
FIGURE 5 is a sectional view taken along line 5—5 in FIGURE 4, showing the top portion of the apparatus.

The "return feed" solenoid 103 for cylinder 22 is wired across the power supply 100 in series with a limit switch 112 that can best be seen in FIGURE 8. Switch 112 has an operating lever 113 that is adapted to be abutted by an adjustable bracket 114 fixed to the left end of the abutment wall 30 on the outer surface of the vertical support 31 (FIGURE 4). The switch 112 will only be closed when the table 15 has reached its fully extended rearward location, and it also is in series with a second normally open timed switch 108b of the cam-actuated rotary switch 108, so that the return of the cylinder 22 can only be accomplished in the desired timed relationship relative to the rotation of the main shaft 80.

The "erector down" solenoid 119 is controlled by means of a "feed-in" switch 115 that also is shown in FIGURE 8. The switch 115 is mounted on the supporting framework at a location forward of the switch 112. Its lever 116 is located so as to be abutted by the lower horizontal rib 32 at the front surface of the abutment wall 30, when the wall 30 is in its forward location. This relationship is also evident in FIGURE 4. At this time, the erector assembly will move downwardly, due to activation of the down solenoid 117, if a third normally open timed switch 108c in the cam-actuated rotary switch 108 is also closed.

The "erector up" solenoid 118 for the valve that controls the cylinder 65 is controlled solely by a normally open timed switch 108d in the switch 108, set so as to correctly bring the partition to an expanded position at the proper timed sequence relative to the other operations.

Thus, the controls for the two cylinders 22 and 65 are mechanically interlocked, and primarily operated in a timed sequence taken directly from the constantly rotating main shaft 80 of the transfer conveyor. In this manner, the sequence of operation is continuously maintained in the proper timed sequence so that the erector apparatus, for instance, does not interfere with the rearward movement of collapsed or expanded partitions past it. This also insures that the fragile expanded partitions will be correctly received on the rigid blocks 87 of the constantly moving transfer conveyor apparatus, and that the partitions will be dropped in a timed sequence upon the bottles located on the conveyor belt 95. Naturally, the bottles on the belt 95 must be located in a timed relationship relative to the spacing slats 96, however the apparatus for accomplishing this relationship, whether manual or mechanical, is not shown in the drawings.

Operation of the device

The sequence of operation has been generally described with relation to the description of the particular elements, but it schematically capsuled in the disclosures of FIGURES 14 through 20. These figures show, in a step-by-step process, the feeding, erection, and transfer of partitions, as well as placement of these partitions over bottles.

Proceeding through there drawings, there is shown in FIGURE 14 a stack of collapsed partitions 120 in the hopper, prior to being fed to the erection assembly. The erection assembly has been broken away in FIGURES 14 and 15 so as to illustrate the pushing of a collapsed carton 121 to the location on the framework wherein it is erected. In FIGURE 15 the cylinder 22 has been retracted so that the strips 28 are in position to feed the lowermost remaining collapsed partition 120 when the cylinder 22 is expanded. FIGURE 14 also illustrates in dashed lines an expanded partition 122 being fed to the transfer conveyor blocks 87 at the same time that the collapsed partition 121 is being located for erection.

FIGURES 16 and 17 illustrate diagrammatically the erection of the partition from its collapsed position to its upright position, and also illustrates the breaking of the vacuum when the parallelogram assembly is fully upright, the partition then being prevented from collapsing by reason of the bracket 76.

As shown in FIGURE 18, the next step is the feeding of the table 15 to the right, causing the expanded partition 121 to be engaged on the horizontal blocks 87 of the transfer conveyor apparatus. FIGURE 18 shows three such partitions on the blocks of the transfer conveyor, being rotated about the axis of shaft 80. It also shows a group of bottles 123 placed on the conveyor belt 95 in a timed relationship relative to the shaft 80, so that the first downcoming partition 124 will be placed over the bottles 123 in a manner illustrated in FIGURES 19 and 20. The partition 124 is shown being urged from the blocks 87 by means of the stripper plates 88, and finally rests between the bottles 123 in its intended final position (FIGURE 20).

It is to be noted from FIGURES 18 through 20 that all of these various steps are continuous. As one partition 121 is being fed to the blocks 87, another collapsed partition 125 is being placed in position for erection. As the partition 124 is being stripped from the lowermost blocks 87 of the transfer conveyor apparatus in FIGURE 19, the abutment wall 30 has already been moved forward and the partition 125 is being erected. In FIGURE 20, another collapsed partition 126 has been fed into position for erection while the partition 125 has been pushed onto the horizontal forward blocks 87 of the transfer conveyor apparatus. Thus, there is always a series of four partitions being acted upon by the various mechanisms at any one time, producing a continuous operation in a rather limited amount of space. The proper interrelation of the various control elements is insured by the rotary switch 108, which prevents actuation of any of the various operating elements except in its proper timed sequence as illustrated in FIGURES 14 through 20.

*Modified transfer conveyor*

When placing the expanded partition into an open carton, it has been found advisable to utilize a more positive placement of the partition than is required when placing such a partition over the tapered necks of bottles. When placed over the bottles on the moving belt, the partition can gradually work downward between the bottles due to the inherent vibrations of the belt. This is not always the case when the partitions are to be located rather tightly within a carton. For this reason, the modification shown in FIGURE 21 and in FIGURE 22 has been devised for this particular purpose. All of the basic mechanisms previously described remain as before, but there is shown an alternative form of transfer conveyor, including a more positive gripping arrangement for holding the expanded cartons.

The main shaft 80, previously described, carries two sets of radial arms 130 that move in unison with it. At the end of each of these arms is a perpendicular plate 131 having a first tapered projection 132 fixed to it and a similar tapered projection 133 pivoted to plate 131 about a hinge 134. Thus, the distance separating the plates 132, 133 can be varied by pivoting of the plate 133 about the hinge 134. A threaded shaft 135 is fixed to the inner surface of the plate 133 and is surrounded by a compression spring 136. The spring 136 abuts against the plate 133 and against a bracket 137 fixed to the inside surface of the fixed plate 132. A threaded nut 138 limits the separation between the two plates 132 and 133.

The plates 132 and 133 replace the solid blocks 87 previously described, and allow for more positive frictional engagement of the expanded partitions by reason of the compression that can be exerted outwardly against the engaged strips 70 of the partition due to the action of the spring 136. The amount of compression, of couse, is governed by the location of the nut 138. In all other respects, this apparatus operates in precisely the same manner as described earlier, and will not be further described herein.

The ejection of the partitions from the plates 132 and 133, on which they have been impaled, is positively controlled by means of a pneumatic cylinder 140 fixed to the supporting framework directly adjacent the shaft 80. The cylinder 140 is shown mounted on a fixed bracket 141 between the two sets of arms 130. It is located as close as possible to the axis of the shaft 80. The piston rod 142 of the cylinder 140 extends vertically downward and terminates in flat enlarged plate 143. The plate 143, when in its upper position, clears the tops of the gripping plates 132 and 133, and when in its lower position, positively pushes partitions from the plates 132, 133 so that the plates are ejected directly downward. This is a very quick action, and does not interfere with the constant movement of shaft 80.

The amount of downward movement of the cylinder 140 is controlled by means of a limit switch 144 on the frame of the cylinder 140, adapted to be contacted by a protruding horizontal ledge 145 at the top of a rod 146 that slides through a bearing 147 in unison with the piston rod 142. The switch 144 causes the actuating valves for the cylinder 140 to be reversed, thereby raising rod 142 and resetting the cylinder 140 for its next pushing operation.

The wiring controls for this assembly are shown also in FIGURE 12, the ejection solenoid 148 being controlled by a fifth normally open timed switch 108e of the rotary switch 108 previously described, so as to eject the partitions from the transfer conveyor apparatus at the proper timed sequence relative to the turning of the shaft 80 and the movement of the conveyor belt 95 on which the cartons must be placed in the proper timed relationship as described earlier with respect to bottles. The limit switch 144 is the only control utilized to reverse movement of the cylinder 140 and return it to its original position, this switch being wired in series across the power supply 100 with the reset solenoid 150.

*Operation of modified transfer conveyor*

The operation of the modified assembly is basically identical to that previously described. It is schematically illustrated in FIGURES 23, 24 and 25, which would replace FIGURES 18, 19 and 20 of the operational sequence previously illustrated. As seen in FIGURE 23, the expanded partition 151 is being pushed onto the transfer conveyor at the same time that a partition 152 is being located for erection purposes. In FIGURE 24, the timed relationship between the feeding of a carton 153 and the downward movement of the lowermost partition 154 is illustrated, at the same time the partition 152 is being erected to its expanded condition. In FIGURE 25, the cylinder 140 has been acuated to push the partition 154 into the carton 153 so as to positively insure proper placement of the partition 154 within the interior of the carton 153. The limit switch 144 is then engaged, returning the plate 143 to its initial upper position to clear the oncoming partition 155. No stripper plates are necessary in this embodiment, due to the quick and positive action of the cylinder 140, although obviously the action of the plate 143 cannot be utilized to push the partitions completely over bottles that might protrude beyond the upper edge of the partitions. The type of ejector for a particular purpose must be selected in order to take into account the requirement of positive location and the nature of the receptacle over which the partitions must be placed.

We have described and illustrated a preferred form of the invention, together with one modification of the transfer conveyor assembly. There are many other modifications that are contemplated in order to adapt this basic arrangement to particular applications involving particular form of dividers and various containers with which they might be utilized. Therefore, the details of the preferred embodiment just described are not to limit the scope of the invention, which is defined in the claims which follow.

Having thus described our invention, we claim:

1. An apparatus for setting up and placement of collapsible paperboard partitions for bottles or the like, comprising:
   a rigid supporting framework;
   a vertical storage hopper mounted on said framework adapted to receive and store a stack of collapsed partitions, said hopper being open at its lower end;
   reciprocable table means mounted on said framework directly below said hopper adapted to support the partitions within the hopper and to selectively shift the lowermost partition from within the hopper to a first location adjacent to said hopper wherein the partition rests upon said table means;
   partition erection means movably carried by said framework directly above said first location adapted to selectively grip and expand an individual partition resting upon said table at said first location;
   transfer conveyor means on said framework adapted to selectively carry individual expanded partitions;
   and means on said framework adapted to selectively cause each expanded partition at said first location to be carried by said transfer conveyor means; said last-named means comprising:
   an upright member fixed to said table means adapted to selectively shift an expanded partition into engagement with said partition conveyor means during movement of a collapsed partition from said hopper to said location adjacent to said hopper.

2. An apparatus for setting up and placement of collapsible paperboard partitions for bottles or the like, comprising:

a rigid supporting framework;

a vertical storage hopper mounted on said framework adapted to receive and store a stack of collapsed partitions, said hopper being open at its lower end;

reciprocable table means mounted on said framework directly below said hopper adapted to support the partitions within the hopper and to selectively shift the lowermost partition from within the hopper to a first location adjacent to said hopper wherein the partition rests upon said table means;

partition erection means movably carried by said framework directly above said first location adapted to selectively grip and expand an individual partition resting upon said table at said first location;

transfer conveyor means on said framework adapted to selectively carry individual expanded partitions;

and means on said framework adapted to selectively cause each expanded partition at said first location to be carried by said transfer conveyor means;

said hopper being situated on said framework so as to locate the length of partitions received therein in a transverse direction, said adjacent location being rearward of said hopper;

said table means comprising:

a horizontal member having a smooth plane top surface extending longitudinally along the framework distance at least two times the partition height, the member having raised transverse steps at its rear portion located above the plane top surface thereof a distance equal to the abutted collapsed vertical thickness of a single partition, the steps having aligned vertical front surfaces and a longitudinal dimension greater than the partition height, the front and rear walls of said hopper being relieved along their lower edges so as to allow free reciprocation of the member in a forward and rearward longitudinal direction relative to said hopper and framework;

and means operatively connected between said framework and said member adapted to selectively reciprocate said member in a longitudinal direction relative to said framework.

3. An apparatus for setting up and placement of collapsible paperboard partitions for bottles or the like, comprising:

a rigid supporting framework;

a vertical storage hopper mounted on said framework adapted to receive and store a stack of collapsed partitions, said hopper being open at its lower end;

reciprocable table means mounted on said framework directly below said hopper adapted to support the partitions within the hopper and to selectively shift the lowermost partition from within the hopper to a first location adjacent to said hopper wherein the partition rests upon said table means;

partition erection means movably carried by said framework directly above said first location adapted to selectively grip and expand an individual partition resting upon said table at said first location;

transfer conveyor means on said framework adapted to selectively carry individual expanded partitions;

and means on said framework adapted to selectively cause each expanded partition at said first location to be carried by said transfer conveyor means;

said transfer conveyor means comprising:

a plurality of radially protruding members rotatably mounted on said framework about an axis parallel to said hopper;

means at the outer end of each member adapted to grip the interior surfaces of an expanded partition;

and drive means operatively connected to said members adapted to rotate said members about said axis in a timed relation relative to said reciprocable table means.

4. An apparatus for setting up and placement of collapsible paperboard partitions for bottles or the like, comprising:

a rigid supporting framework;

a vertical storage hopper fixed to said framework adapted to receive a stack of callapsed partitions oriented transversely across said framework;

a reciprocable table mounted on said framework directly under said hopper and having a raised front portion adapted to abut the lowermost partition in said hopper and selectively push said partition rearwardly along said framework to a location rearwardly adjacent one wall of said hopper;

partition erection means movably mounted on said framework above said table at said last-named location adapted to grip at least one surface of a collapsed partition pushed from said hopper by said table and to vertically expand the gripped partition;

operating means on said framework operatively connected to said reciprocable table and to said partition erection means adapted to operate them in a timed relationship to alternately deliver and expand partitions;

and a vertical abutment fixed to said table and extending above said table at a location spaced rearwardly from said one wall of said hopper a longitudinal distance greater than the partion height, said abutment being relieved along its lower edge adjacent to said table and across the width of a partition located thereon so as to allow said abutment to pass forwardly over a collapsed partition delivered from said hopper.

5. An apparatus as defined in claim 4, further comprising:

partition transfer conveyor means on said framework adjacent to said table and abutment adapted to grip individual expanded partitions moved toward said partition conveyor means by said abutment;

drive means on said framework operatively connected to said partition transfer conveyor means;

and means operatively connected to said operating means and said drive means adapted to move said transfer conveyor means in a timed relationship relative to movement of said table.

6. An apparatus as defined in claim 4, further comprising:

a partition conveyor rotatably mounted on said framework about a horizontal transverse axis, said conveyor being located outwardly from said hopper beyond said abutment and including radial arms terminating short of the abutment when located at its outermost position relative to said hopper;

and means at the end of each of said arms adapted to grip the surfaces of an expanded carton moved toward said arms by said abutment.

7. An apparatus as defined in claim 6 wherein said last-named means comprises:

a solid block fixed to the end of each of said arms adapted to be frictionally received between intersecting members of an expanded partition.

8. An apparatus as defined in claim 6 wherein said last-named means comprises:

a first member fixed to said arm and extending outwardly therefrom;

a second member pivotally carried on said arm for movement of its outer end toward said first member, said first and second members being adapted to be frictionally received between intersecting members of an expanded partition;

and biasing means connected to the second member urging it in a direction opposite to said first member.

9. An apparatus as defined in claim 6 further comprising:
  partition ejector means on said framework adapted to selectively remove partitions from said partition conveyor.

10. An apparatus for setting up and placement of collapsible paperboard partitions for bottles and the like, comprising:
  a rigid supporting framework;
  a vertical storage hopper fixed to said framework adapted to receive and store a stack of collapsed partitions oriented transversely across said framework, the bottom of the hopper being open and free of support;
  a reciprocable table mounted on said framework directly under said hopper for longitudinal motion relative to said framework in a horizontal plane, said table having a raised front portion adapted to abut the front edge of the lowermost partition within said hopper, said hopper having a front wall relieved along its bottom edge so as to permit free passage of said table and a rear wall relieved along its bottom edge so as to permit free passage of a partition abutted by the raised front portion of said table;
  first powered means on said framework connected to said table adapted to reciprocate said table longitudinally relative to said framework between a forward position wherein the raised portion of said table is forward of the lowermost partition within said hopper and a rear position wherein the rear edge of said raised portion is located rearwardly of the rear wall of said hopper;
  movable stop means mounted on said framework rearwardly of said hopper and adjacent to said table adapted to abut the front wall of a partition located rearwardly of said hopper during subsequent return of said table to said forward position;
  and a vertical abutment fixed to said table rearwardly of said hopper and extending transversely of said table, the lower edge of said abutment being relieved so as to permit free forward passage of said abutment over a partition resting on said table in abutment with said movable stop means.

11. An apparatus for setting up and placement of collapsible paperboard partitions for bottles and the like, comprising:
  a rigid supporting framework;
  a vertical storage hopper fixed to said framework adapted to receive and store a stack of collapsed partitions oriented transversely across said framework, the bottom of the hopper being open and free of support;
  a reciprocable table mounted on said framework directly under said hopper for longitudinal motion relative to said framework in a horizontal plane, said table having a raised front portion adapted to abut the front edge of the lowermost partition within said hopper, said hopper having a front wall relieved along its bottom edge so as to permit free passage of said table and a rear wall relieved along its bottom edge so as to permit free passage of a partition abutted by the raised front portion of said table;
  first powered means on said framework connected to said table adapted to reciprocate said table longitudinally relative to said framework between a forward position wherein the raised portion of said table is forward of the lowermost partition within said hopper and a rear position wherein the rear edge of said raised portion is located rearwardly of the rear wall of said hopper;
  partition erection means movably mounted on said framework above said table adapted to selectively grip the members of a partition fed from said hopper upon said table and to pivot said members upwardly relative to said framework to thereby expand the partition;
  and second powered means on said framework connected to said partition erection means adapted to selectively move said erection means relative to said framework from a first position wherein said erection means contacts a collapsed partition upon said table to a second position wherein the expanded partition is vertically supported along its lower edges by said table.

12. An apparatus for setting up and placement of collapsible paperboard partitions for bottles and the like, comprising:
  a rigid supporting framework;
  a vertical storage hopper fixed to said framework adapted to receive and store a stack of collapsed partitions oriented transversely across said framework, the bottom of the hopper being open and free of support;
  a reciprocable table mounted on said framework directly under said hopper for longitudinal motion relative to said framework in a horizontal plane, said table having a raised front portion adapted to abut the front edge of the lowermost partition within said hopper, said hopper having a front wall relieved along its bottom edge so as to permit free passage of said table and a rear wall relieved along its bottom edge so as to permit free passage of a partition abutted by the raised front portion of said table;
  first powered means on said framework connected to said table adapted to reciprocate said table longitudinally relative to said framework between a forward position wherein the raised portion of said table is forward of the lowermost partition within said hopper and a rear position wherein the rear edge of said raised portion is located rearwardly of the rear wall of said hopper;
  a vertical abutment fixed to said table rearwardly of said hopper and extending transversely of said table, the lower edge of said abutment being relieved so as to permit free forward passage of said abutment over a partition resting on said table in abutment with said movable stop means;
  partition erection means movably mounted on said framework above said table adapted to selectively grip the members of a partition fed from said hopper upon said table and to pivot said members upwardly relative to said framework to thereby expand the partition;
  second powered means on said framework connected to said partition erection means adapted to selectively move said erection means relative to said framework from a first position wherein said erection means contacts a collapsed partition upon said table to a second position wherein the expanded partition is vertically supported along its lower edges by said table;
  and first control means on said framework operatively connected to said first and second powered means adapted to cause said first and second powered means to be operated in a timed sequence to successively feed a partition rearwardly from said hopper upon said table, return said table to its forward position, move said erection means to said first position and then move said erection means to said second position.

13. An apparatus as defined in claim 12, further comprising:
  second control means on said framework operatively connected to said table and to said second powered means adapted to allow said second powered means to move said erection means to said first position only after said table has reached said forward position.

14. An apparatus as defined in claim 12, further comprising:
  third control means on said framework operatively connected to said erection means and said first powered means adapted to allow said first powered means to move said table to said rear position only after said erection means has reached said second position.

15. An apparatus for setting up and placement of collapsible paperboard partitions for bottles and the like, comprising:

a rigid supporting framework;

a vertical storage hopper fixed to said framework adapted to receive and store a stack of collapsed partitions oriented transversely across said framework, the bottom of the hopper being open and free of support;

a reciprocable table mounted on said framework directly under said hopper for longitudinal motion relative to said framework in a horizontal plane, said table having a raised front portion adapted to abut the front edge of the lowermost partition within said hopper, said hopper having a front wall relieved along its bottom edge so as to permit free passage of said table and a rear wall relieved along its bottom edge so as to permit free passage of a partition abutted by the raised front portion of said table;

first powered means on said framework connected to said table adapted to reciprocate said table longitudinally relative to said framework between a forward position wherein the raised portion of said table is forward of the lowermost partition within said hopper and a rear position wherein the rear edge of said raised portion is located rearwardly of the rear wall of said hopper;

said apparatus further comprising a partition erection mechanism, comprising:

first and second transversely spaced parallel crank arms respectively pivoted at one end to said framework about parallel support axes at each side of said table;

a pair of parallel horizontal arms pivotally carried at their respective ends about second and third axes spaced outwardly from and parallel to said support axes;

means connected between said framework and said first crank arm adapted to pivot said first crank arm ninety degrees about its support axis between a first horizontal position and a second vertical upright position;

wherein a plane containing said second and third axes on said crank arms subtends an angle 45° upward from the horizontal relative to the planes containing the respective pivotal axes of said horizontal arms when said first crank arm is in its first horizontal position;

and a plurality of vacuum cup members, each pivotally carried on said pair of horizontal arms about respective axes aligned in planes parallel to the planes of said second and third axes on said crank arms, including individual vacuum cups directed horizontally downward when said first crank arm is in its first horizontal position and directed vertically when said first crank arm is in its second vertical position, said vacuum cups being located above a partition when located on said table rearward of said hopper.

16. An apparatus as defined in claim 15, further comprising:

a vacuum breaker mounted on said frame adjacent one of said crank arms and connected between a vacuum source and said vacuum cups, said breaker being normally closed;

and lever means fixed to said one crank arm operatively engageable with said vacuum breaker adapted to open said breaker when said one crank arm has been raised to a vertical position by said means connected between said framework and said first crank arm.

17. An apparatus as defined in claim 15, further comprising:

a fixed member mounted on one of said horizontal arms adapted to move in unison therewith, said member having a vertical plane surface extending longitudinally relative to said framework and located directly adjacent to and facing one of said vacuum cups when said first crank arm is in its second vertical position adapted to abut the surface of a partition member opposite to the surface thereof engaged by said one vacuum cup.

References Cited by the Examiner
UNITED STATES PATENTS

| | | | |
|---|---|---|---|
| 2,612,823 | 10/1952 | Woelfer | 93—53 |
| 2,827,838 | 3/1958 | Pearson | 93—53 X |
| 3,149,750 | 9/1964 | Kulbicki | 221—224 |

MARVIN A. CHAMPION, *Primary Examiner.*